US012754451B2

(12) United States Patent
Takahashi et al.

(10) Patent No.: US 12,754,451 B2
(45) Date of Patent: Oct. 6, 2026

(54) METHOD OF MANUFACTURING ELECTRO-OPTICAL DEVICE

(71) Applicant: SEIKO EPSON CORPORATION, Tokyo (JP)

(72) Inventors: Shogo Takahashi, Chino (JP); Kikuya Morita, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 569 days.

(21) Appl. No.: 18/183,961

(22) Filed: Mar. 15, 2023

(65) Prior Publication Data

US 2023/0296949 A1 Sep. 21, 2023

(30) Foreign Application Priority Data

Mar. 18, 2022 (JP) ................................ 2022-043555

(51) Int. Cl.
*G02F 1/1368* (2006.01)
*G02F 1/1362* (2006.01)

(52) U.S. Cl.
CPC ...... *G02F 1/1368* (2013.01); *G02F 1/136209* (2013.01); *G02F 1/136277* (2013.01)

(58) Field of Classification Search
CPC ............. G02F 1/1368; G02F 1/136209; G02F 1/136277
See application file for complete search history.

(56) References Cited

U.S. PATENT DOCUMENTS

2017/0031221 A1 2/2017 Sugimoto et al.
2017/0102596 A1 4/2017 Sugimoto
2018/0239205 A1 8/2018 Yokota

FOREIGN PATENT DOCUMENTS

JP 2004363300 12/2004
JP 2012-123142 6/2012
JP 2015-094880 5/2015
JP 2015-197584 11/2015
JP 2017-072741 4/2017
JP 2018-136478 8/2018
JP 2020177126 A * 10/2020
KR 20200020327 2/2020

OTHER PUBLICATIONS

English Translation of Sugimoto JP 2020177126 A (Year: 2020).*

* cited by examiner

*Primary Examiner* — Lucy P Chien
(74) *Attorney, Agent, or Firm* — JCIPRNET

(57) ABSTRACT

A method of manufacturing an electro-optical device includes the steps of: forming a recessed portion at an insulating member; forming a first capacitance electrode, a capacitance insulation film, and a second capacitance electrode along the recessed portion; concurrently patterning the first capacitance electrode, the capacitance insulation film, and the second capacitance electrode; removing a portion of the second capacitance electrode; forming an interlayer insulating film; and etching, until a portion of the first capacitance electrode is exposed in plan view, a region where the portion of the second capacitance electrode is removed, to form a contact hole penetrating through the interlayer insulating film and the capacitance insulation film.

9 Claims, 14 Drawing Sheets

METHOD OF MANUFACTURING ELECTRO-OPTICAL DEVICE

The present application is based on, and claims priority from JP Application Serial Number 2022-043555, filed on Mar. 18, 2022, the disclosure of which is hereby incorporated by reference herein in its entirety.

BACKGROUND

1. Technical Field

The present disclosure relates to a method of manufacturing an electro-optical device.

2. Related Art

JP-A-2012-123142 discloses a structure of a capacitance element in which a dielectric layer is interposed between a first electrode at a lower layer and a second electrode at an upper layer.

A method of manufacturing a capacitance element includes forming the first electrode and also forming the dielectric layer at the first electrode. Next, an oxide film is formed. The oxide film functions as an etching stopper layer when the second electrode is formed. After this, a portion of the oxide film that is to be a capacitance element is removed, and a film that is to be the second electrode is formed on the dielectric layer and the oxide film. Lastly, by using the oxide film as an etching stopper layer, the second electrode is formed through an etching process, whereby a capacitance element is completed.

The capacitance element is formed along a protruding shape as in JP-A-2015-094880 or formed along a recessed shape, whereby it is possible to obtain capacitance while achieving miniaturization.

However, in a case of a typical capacitance element, when the capacitance element is formed especially along the recessed shape, there is a problem in that the oxide film used as the etching stopper layer cannot be removed in the capacitance element having the recessed shape, and is left there.

SUMMARY

A method of manufacturing an electro-optical device includes forming a recessed portion at an insulating member, forming a first capacitance electrode, a capacitance insulation film, and a second capacitance electrode along the recessed portion, concurrently patterning the first capacitance electrode, the capacitance insulation film, and the second capacitance electrode, removing a portion of the second capacitance electrode, forming an interlayer insulating film, and etching, until a portion of the first capacitance electrode is exposed in plan view, a region where the portion of the second capacitance electrode is removed, to form a first contact hole penetrating through the interlayer insulating film and the capacitance insulation film.

DESCRIPTION OF EXEMPLARY EMBODIMENTS

In each of the following drawings, description will be made on the assumption that three axes perpendicular to each other are the X-axis, the Y-axis, and the Z-axis. The direction along the X-axis is the "X direction". The direction along the Y-axis is the "Y direction". The direction along the Z-axis is the "Z direction". The arrowed direction is the +direction. The direction opposite to the +direction is the −direction. Note that the +Z direction may be referred to as "up" or "upward". The −Z direction may be referred to as "down" or "downward". The view from the +Z direction may be referred to as plan view or planar view. Furthermore, description will be made on the assumption that a surface located at the +side in the Z direction is an upper surface, and a surface that is located at the −side in the Z direction and is opposite from the upper surface is a lower surface.

In addition, in the following description, for example, description of a substrate as "on the substrate" represents a case of being disposed on the substrate in a contact manner, or a case of being disposed above the substrate with another structure being interposed therebetween, or a case of being disposed at the substrate such that a portion is in contact with the substrate and a portion is disposed above the substrate with another structure being interposed between the portion and the substrate.

First, with reference to FIGS. 1 and 2, the configuration of a liquid crystal device 100 serving as an electro-optical device will be described.

Figure 1:
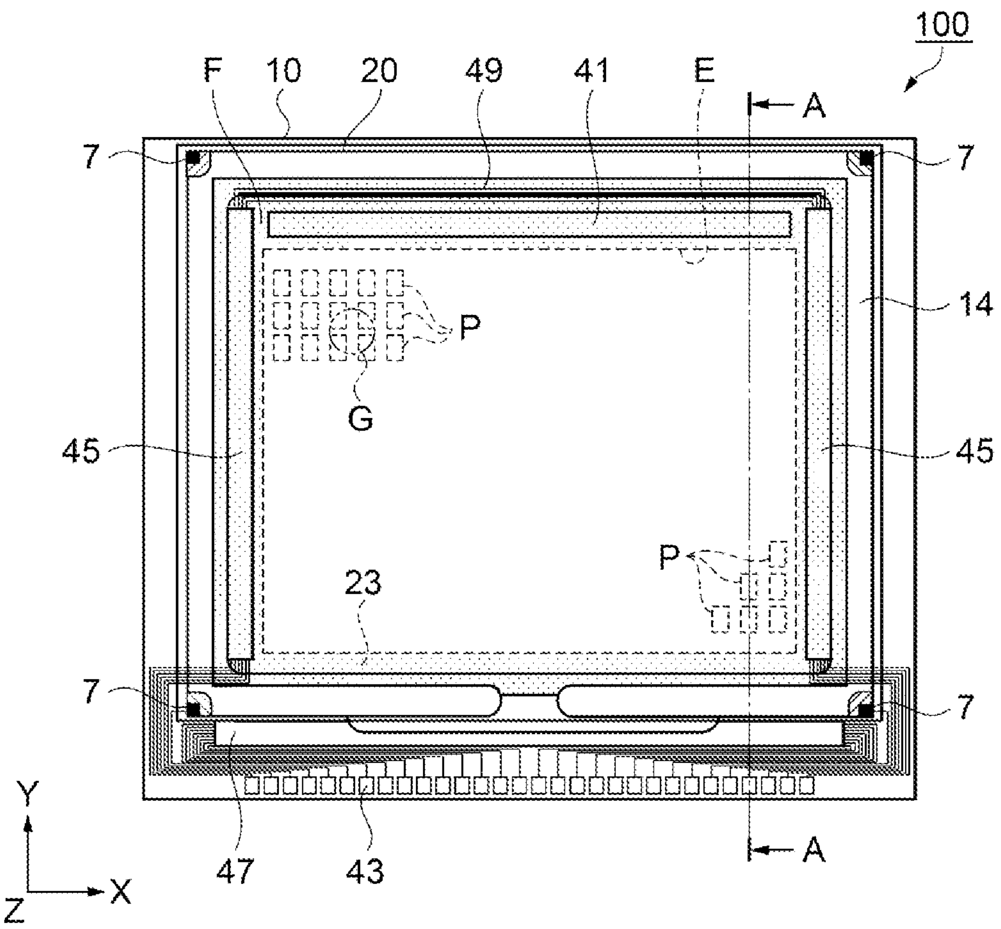
FIG. 1 is a plan view illustrating a configuration of a liquid crystal device serving as an electro-optical device.
Figure 2:
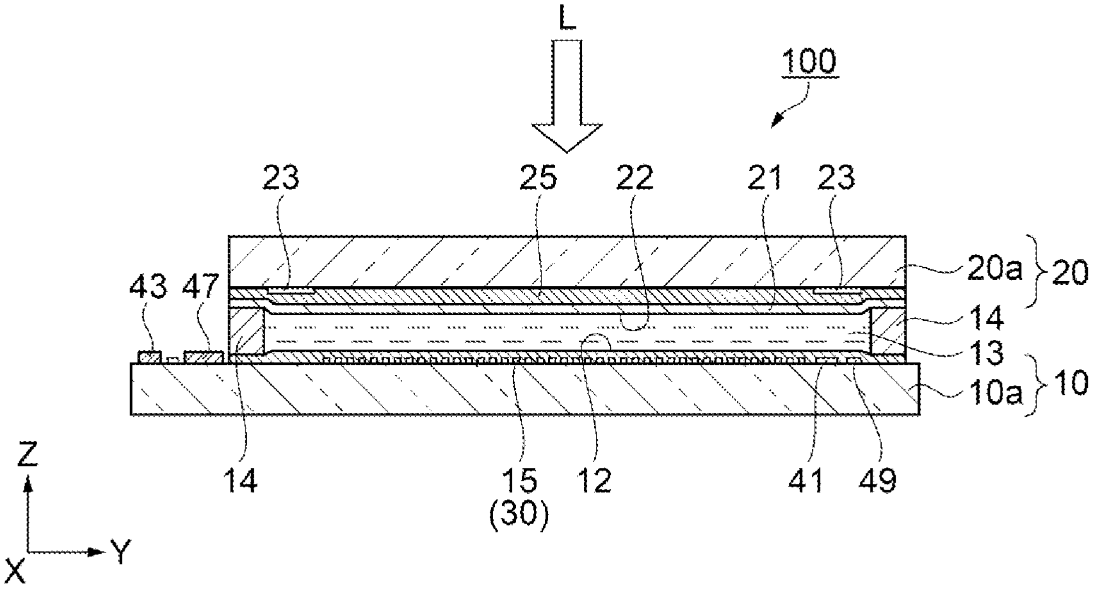
FIG. 2 is a cross-sectional view taken along the line A-A in the liquid crystal device illustrated in FIG. 1.

As illustrated in FIGS. 1 and 2, the liquid crystal device 100 according to the present embodiment includes an element substrate 10, a counter substrate 20 disposed so as to be opposed to the element substrate 10, and a liquid crystal layer 13 interposed between the element substrate 10 and the counter substrate 20.

For example, a substrate such as a glass substrate or a quartz substrate is used for a substrate 10*a* of the element substrate 10. For example, a transparent substrate such as a glass substrate or a quartz substrate is used for a substrate 20*a* of the counter substrate 20.

The shape of the element substrate 10 in plan view is greater than the counter substrate 20. The element substrate 10 and the counter substrate 20 are joined to each other with a seal material 14 being interposed therebetween. The seal material 14 is disposed along the outer edge of the counter substrate 20. Liquid crystal having positive or negative dielectric anisotropy is encapsulated in a gap between the element substrate 10 and the counter substrate 20 to provide the liquid crystal layer 13.

A display region E is provided inside of the seal material 14. The display region E contains a plurality of pixels P arrayed in a matrix manner. The outside of the display region E is a peripheral area F. In the peripheral area F, a partition portion 23 is provided between the seal material 14 and the display region E so as to surround the display region E. A dummy pixel area that does not contribute to displaying and is not illustrated in the drawing is provided at a portion of the peripheral area F that is located at the most display region E side.

A terminal portion including a plurality of external connection terminals 43 arrayed therein is provided in the peripheral area F of the element substrate 10. In the peripheral area F, a data line driving circuit 47 is provided between a first side portion extending along the terminal portion and the seal material 14. In addition, in the peripheral area F, an inspection circuit 41 is provided between the display region E and the seal material 14 along a second side portion that is opposed to the first side portion.

In the peripheral area F, a scanning line drive circuit 45 is provided between the display region E and the seal material 14 along a third side portion and a fourth side portion that are opposed to each other and are each perpendicular to the first side portion. Furthermore, a plurality of wiring lines 49 coupling two scanning line drive circuits 45 are provided between the inspection circuit 41 and the seal material 14 at the second side portion.

Wiring lines coupled to the data line driving circuit 47 and the scanning line drive circuit 45 are coupled to the plurality of external connection terminals 43 arrayed along the first side portion. Note that the arrangement of the inspection circuit 41 is not limited to that described above.

As illustrated in FIG. 2, a light-transmitting pixel electrode 15, a transistor 30 serving as a switching element, the wiring lines 49, an alignment film 12 that covers them are provided at the front surface of the substrate 10*a* at the liquid crystal layer 13 side, the light-transmitting pixel electrode 15 being provided for each of the pixels P. The transistor 30 and the pixel electrode 15 are constituent elements of the pixel P. The element substrate 10 includes the substrate 10*a*, the pixel electrode 15 provided on the substrate 10*a*, the transistor 30, the wiring line 49, and the alignment film 12.

The partition portion 23, an insulating film 25 formed by covering the partition portion 23, a counter electrode 21 provided as a common electrode and formed by covering the insulating film 25, and an alignment film 22 that covers the counter electrode 21 are provided at the front surface of the substrate 20*a* at the liquid crystal layer 13 side. The counter substrate 20 according to the present embodiment includes at least the partition portion 23, the counter electrode 21, and the alignment film 22. Note that the present embodiment gives an example in which the common electrode is provided as the counter electrode 21 at the counter substrate 20 side. However, the arrangement is not limited to this.

As illustrated in FIG. 1, the scanning line drive circuit 45 and the inspection circuit 41 overlap with the partition portion 23 in plan view. The partition portion 23 functions as a light shielding portion, and blocks light L emitted from a laser light source that is not illustrated and entering from the counter substrate 20 side, so as not to enter peripheral circuits such as the scanning line drive circuit 45, thereby playing a roll to prevent the peripheral circuits from inappropriately operating. In addition, the partition portion 23 blocks the unnecessary stray light so as not to enter the display region E, thereby suppressing a deterioration of contrast.

The insulating film 25 is made, for example, of an inorganic material such as a silicon oxide ($SiO_2$) having optical transparency. The insulating film 25 is provided so as to cover the partition portion 23 and flatten the front surface at the liquid crystal layer 13 side.

The counter electrode 21 covers the insulating film 25, and is electrically coupled to an upward-downward conduction portion 7 provided at four corners of the counter substrate 20. The upward-downward conduction portion 7 is electrically coupled to a common wiring line 9 that will be described later.

The pixel electrode 15 and the counter electrode 21 are made, for example, of a transparent electrically conducting film made of indium tin oxide (ITO), indium zinc oxide (IZO), or the like. The alignment film 12 and the alignment film 22 are selected on the basis of optical design of the liquid crystal device 100. The material used to form the alignment films 12, 22 includes an inorganic alignment film made of silicon oxide or the like, and an organic alignment film made of polyimide or the like.

Such a liquid crystal device 100 employs optical design including a normally white mode in which the transmittance of a pixel P when no voltage is applied is greater than the transmittance when a voltage is applied, and a normally black mode in which the transmittance of a pixel P when no voltage is applied is lower than the transmittance when a voltage is applied. In the liquid crystal device 100, a polarizing element is disposed at a light entering side and a light outputting side in accordance with the optical design.

Hereinafter, the present embodiment describes an example in which an inorganic alignment film that has been described above is used as the alignment films 12, 22, liquid crystal having negative dielectric anisotropy is used, and the normally black mode is applied as the optical design.

In addition, the embodiment described above employs the liquid crystal device 100 of a transmissive type as an example of the electro-optical device. However, a reflective type liquid crystal device or a liquid crystal device of liquid crystal on silicon type (LCOS) may be used as the liquid crystal device 100.

Furthermore, description has been made of the liquid crystal device 100 as one example of the electro-optical device. However, the electro-optical device is not limited to this. For example, it may be possible to apply the present disclosure to an organic electro luminescence (EL) device, an electrophoretic display panel using a micro capsule, or the like.

Next, the configuration of the pixel P will be described with reference to FIGS. 3 and 4.

Figure 4:
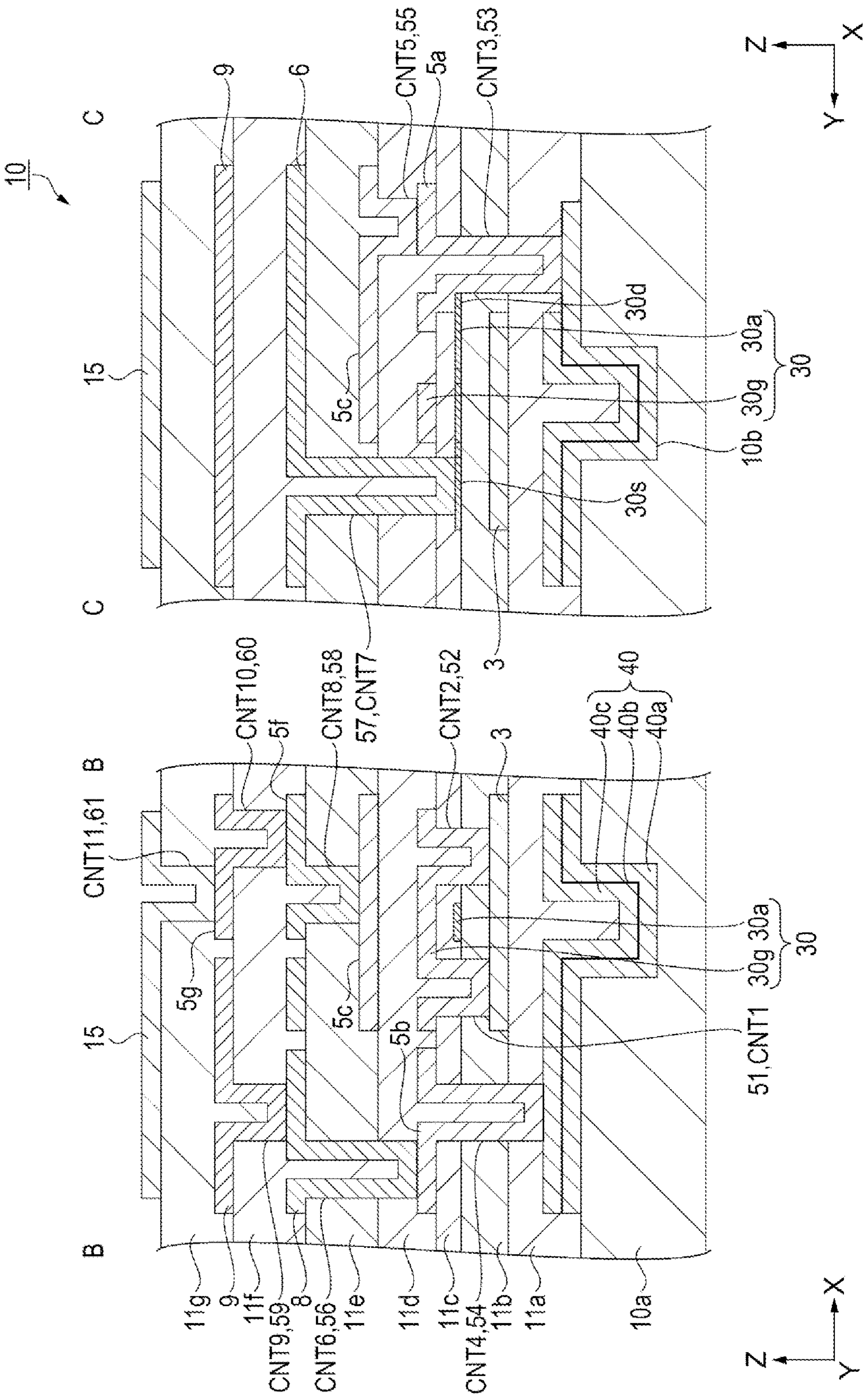
FIG. 4 is a cross-sectional view taken along the line B-B and the line C-C in the liquid crystal device illustrated in FIG. 3.

First, as illustrated in FIG. 4, the element substrate 10 of the liquid crystal device 100 includes the substrate 10*a*, a capacitance element 40, a scanning line 3, the transistor 30, a data line 6, the common wiring line 9, and the pixel electrode 15. The substrate 10*a* includes a recessed portion 10*b* where the capacitance element 40 is provided. In addition, a plurality of interlayer insulating films 11 are stacked at the substrate 10*a*.

The plurality of interlayer insulating films 11 include, in the order from below: a first interlayer insulating film 11*a* including a portion of the capacitance element 40; a second interlayer insulating film 11*b* including the scanning line 3; a third interlayer insulating film 11*c* including a semiconductor layer 30*a*; a fourth interlayer insulating film 11*d* including a gate electrode 30*g*; a fifth interlayer insulating film 11*e* including a relay electrode 5*c*; a sixth interlayer insulating film 11*f* including the data line 6 and a capacitance line 8; and a seventh interlayer insulating film 11*g* including the common wiring line 9.

The material of the plurality of interlayer insulating films 11 includes, for example, silicon oxide (None-doped Silicate Glass: NSG) or silicon nitride or the like. In the present embodiment, silicon oxide is used as the material used to form the interlayer insulating films 11.

In the capacitance element 40, a first capacitance electrode 40*a*, a capacitance insulation film 40*b*, and a second capacitance electrode 40*c* are stacked sequentially from the substrate 10*a* side. The material of the first capacitance electrode 40*a* and the second capacitance electrode 40*c* includes, for example, electrically conductive polysilicon. A dielectric material is used as the material of the capacitance insulation film 40*b*. The dielectric material includes, for example, silicon nitride, silicon oxide, hafnium oxide, aluminum oxide, tantalum oxide, and the like, and these films are used as a single layer or in combination.

Figure 3:
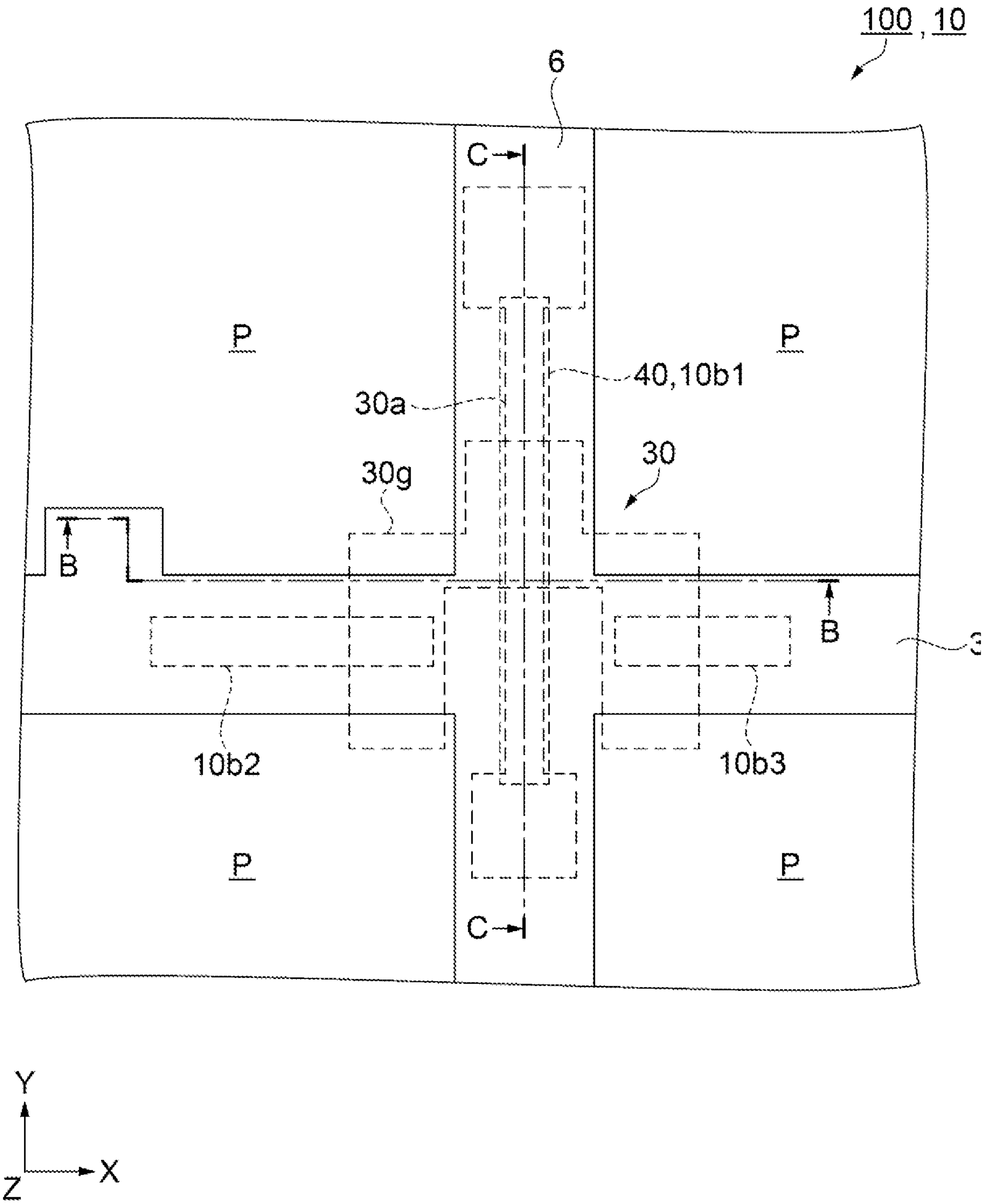
FIG. 3 is a plan view illustrating the liquid crystal device in FIG. 1 such that a portion G thereof is enlarged.

As illustrated in FIG. 3, a portion of the capacitance element 40 is provided, for example, along a recessed portion 10*b*1 having a substantially rectangular shape and extending along the Y direction that is a first direction. In this manner, the recessed portion 10*b* is formed so as to overlap with the semiconductor layer 30*a*, which makes it possible to maintain an opening ratio without reducing the width of the opening area. In addition, a portion of the capacitance element 40 is provided also along recessed portions 10*b*2, 10*b*3 having a rectangular shape and extending in the X direction.

The scanning line 3 also functions as a light shielding film, and is provided at the first interlayer insulating film 11*a*. The scanning line 3 is provided along the X direction and between a pixel P and a pixel P in plan view as illustrated in FIG. 3. For the scanning line 3, it is possible to use a known material having a light shielding property and electrical conductivity. Thus, the scanning line 3 has a function of blocking light entering the semiconductor layer 30*a* mainly from below. In the present embodiment, tungsten silicide is used as a material for forming the scanning line 3.

The transistor 30 includes: the semiconductor layer 30*a* provided at the second interlayer insulating film 11*b*; the third interlayer insulating film 11*c* functioning as a gate insulating film; and the gate electrode 30*g* provided at the third interlayer insulating film 11*c*. A lightly doped drain (LDD) structure is formed at the semiconductor layer 30*a* of the transistor 30. The semiconductor layer 30*a* is made, for example, of electrically conductive polysilicon. The gate electrode 30*g* is made, for example, of electrically conductive polysilicon. The semiconductor layer 30*a* extends along the Y direction that is the first direction in plan view as illustrated in FIG. 3.

The gate electrode 30*g* is electrically coupled to the scanning line 3 through contact electrodes 51 and 52. The contact electrodes 51, 52 extend through the third interlayer insulating film 11*c* and the second interlayer insulating film 11*b*.

The relay electrode 5*a* is electrically coupled to a source drain region 30*d* and the first capacitance electrode 40*a* through a contact electrode 53 provided so as to extend through the third interlayer insulating film 11*c*, the second interlayer insulating film 11*b*, the first interlayer insulating film 11*a*, and the capacitance insulation film 40*b*.

The relay electrode 5*b* is electrically coupled to the second capacitance electrode 40*c* through a contact electrode 54 provided so as to extend through the third interlayer insulating film 11*c*, the second interlayer insulating film 11*b*, and the first interlayer insulating film 11*a*.

The data line 6 extends in the Y direction and between a pixel P and a pixel P as illustrated in FIG. 3. For the material used to form the data line 6, it may be possible to use any material as long as the material is a wiring line material having electrical conductivity and low resistance, and the material includes, for example, a metal such as aluminum (Al) or titanium (Ti), or a metallic compound thereof. The data line 6 is electrically coupled to a source drain region 30*s* of the semiconductor layer 30*a* through a contact hole CNT7.

The capacitance line 8 and the common wiring line 9 are electrically coupled to the counter electrode 21, and are provided with a common potential. As with the data line 6, for the material used to form the capacitance line 8 and the common wiring line 9, it may be possible to use any material as long as the material is a wiring line material having electrical conductivity and low resistance, and the material includes, for example, a metal such as aluminum (Al) or titanium (Ti), or a metallic compound thereof.

The pixel electrode 15 is provided at the seventh interlayer insulating film 11*g*. The pixel electrode 15 is made, for example, of a transparent electrically conducting film such as ITO.

Although illustration is not given, the pixel electrode 15 is covered to provide the alignment film 12. The alignment film 12 of the element substrate 10 and the alignment film 22 of the counter substrate 20 described above are made of a collective body of columns obtained by depositing an inorganic material such as silicon oxide in a predetermined direction such as a diagonal direction to grow it into a column shape. Furthermore, liquid crystal molecules contained in the liquid crystal layer 13 illustrated in FIG. 2 have negative dielectric anisotropy relative to the alignment films 12, 22.

Next, a method of manufacturing the liquid crystal device 100 will be described with reference to FIGS. 5A to 15. Note that, below, description will be made of a method of manufacturing the element substrate 10 of the liquid crystal device 100. Note that, of FIG. 5A to FIG. 15, the plan views correspond to FIG. 3, and the cross-sectional views correspond to FIG. 4.

Note that, basically, the element substrate 10 can be manufactured by using known methods in semiconductor processing including a low-pressure chemical vapor deposition (CVD) method, an atmospheric pressure CVD, a plasma CVD process, a photolithography method, a sputtering method, an etching method, a chemical mechanical planarization (CMP), or a combination thereof. Below, a preferred manufacturing method will be mainly described. However, it may be possible to employ different manufacturing methods, provided that an equivalent structure can be formed and functions and characteristics of the configuration can be satisfied.

Figure 5A:
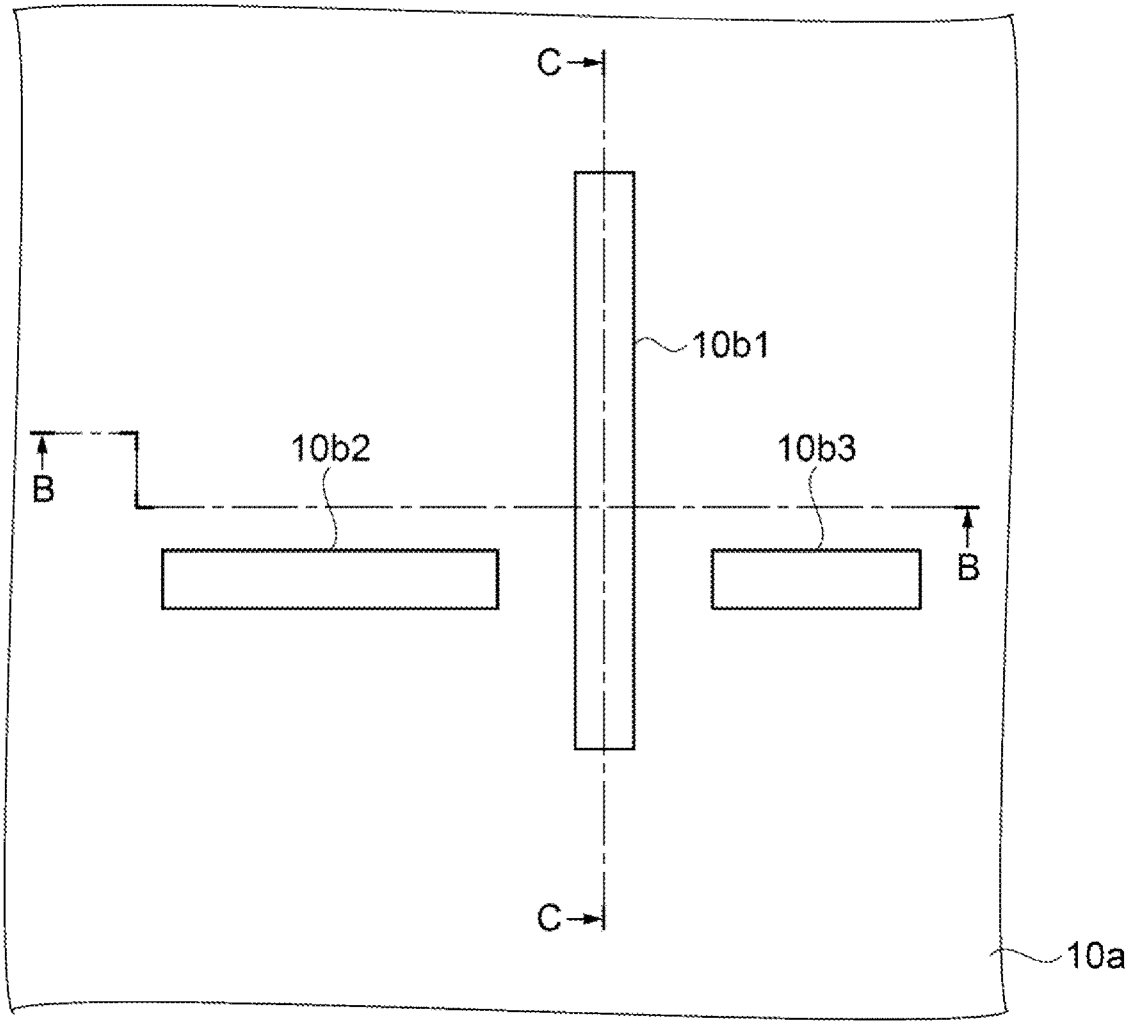
FIG. 5A is a plan view illustrating a method of manufacturing a liquid crystal device.
Figure 5B:
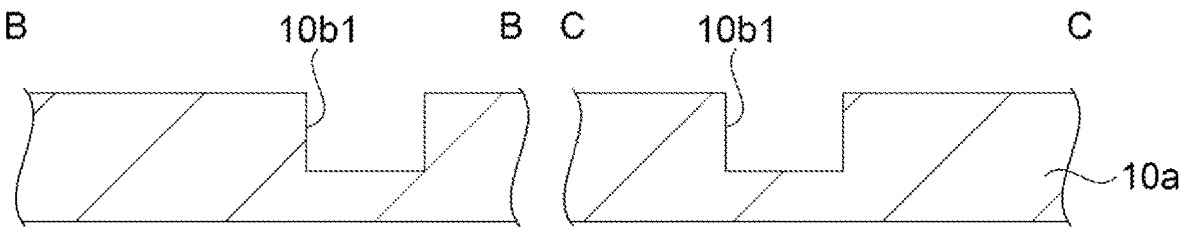
FIG. 5B is a cross-sectional view illustrating a method of manufacturing a liquid crystal device.

In the process illustrated in FIGS. 5A and 5B, the recessed portion 10*b* is formed in the substrate 10*a* serving as an insulating member. As illustrated in FIG. 5A, the recessed portion 10*b*1 is formed into a rectangular shape along the Y direction. Note that, in the present embodiment, the capacitance element 40 is also formed in the X direction, and hence, recessed portions 10*b*2 and 10*b*3 are formed in the substrate 10*a*. Note that the insulating member is not limited to the substrate 10*a*, and includes the interlayer insulating film 11 provided at the substrate 10*a*, or the like.

Figure 6A:
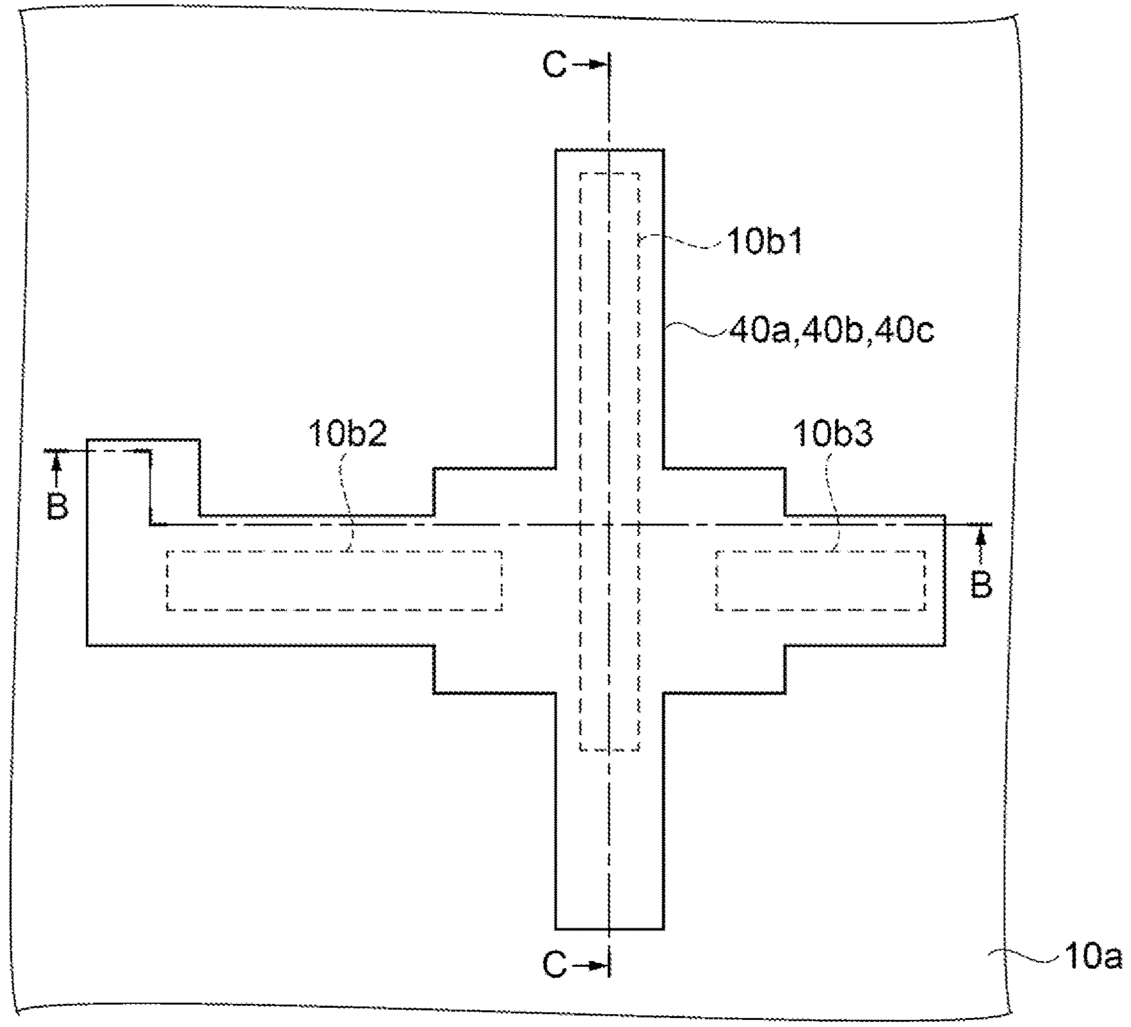
FIG. 6A is a plan view illustrating a method of manufacturing a liquid crystal device.
Figure 6B:
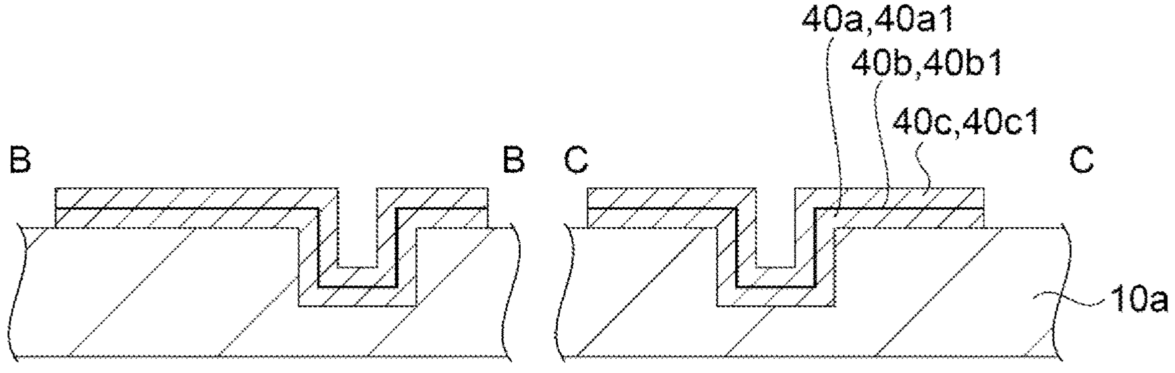
FIG. 6B is a cross-sectional view illustrating a method of manufacturing a liquid crystal device.

In the process illustrated in FIGS. 6A and 6B, an electrically conductive polysilicon film 40*a*1, a capacitance insulation film 40*b*1 containing silicon nitride, and an electrically conductive polysilicon film 40*c*1, which are to be the capacitance element 40 later, are sequentially formed at the substrate 10*a* including the recessed portions 10*b*1, 10*b*2, and 10*b*3. Next, dry etching is performed to concurrently pattern the polysilicon film 40*a*1, the capacitance insulation film 40*b*1, and the polysilicon film 40*c*1. Here, the "concurrently pattern" means sequentially applying a dry etching process within the same device regardless of whether the chamber differs or not. Hereinbelow, the same applies. Thus, the capacitance element 40 is completed, the capacitance element 40 including the first capacitance electrode 40*a*, the capacitance insulation film 40*b*, and the second capacitance electrode 40*c* corresponding to the polysilicon film 40*a*1, the capacitance insulation film 40*b*1, and the polysilicon film 40*c*1, respectively.

Figure 7A:
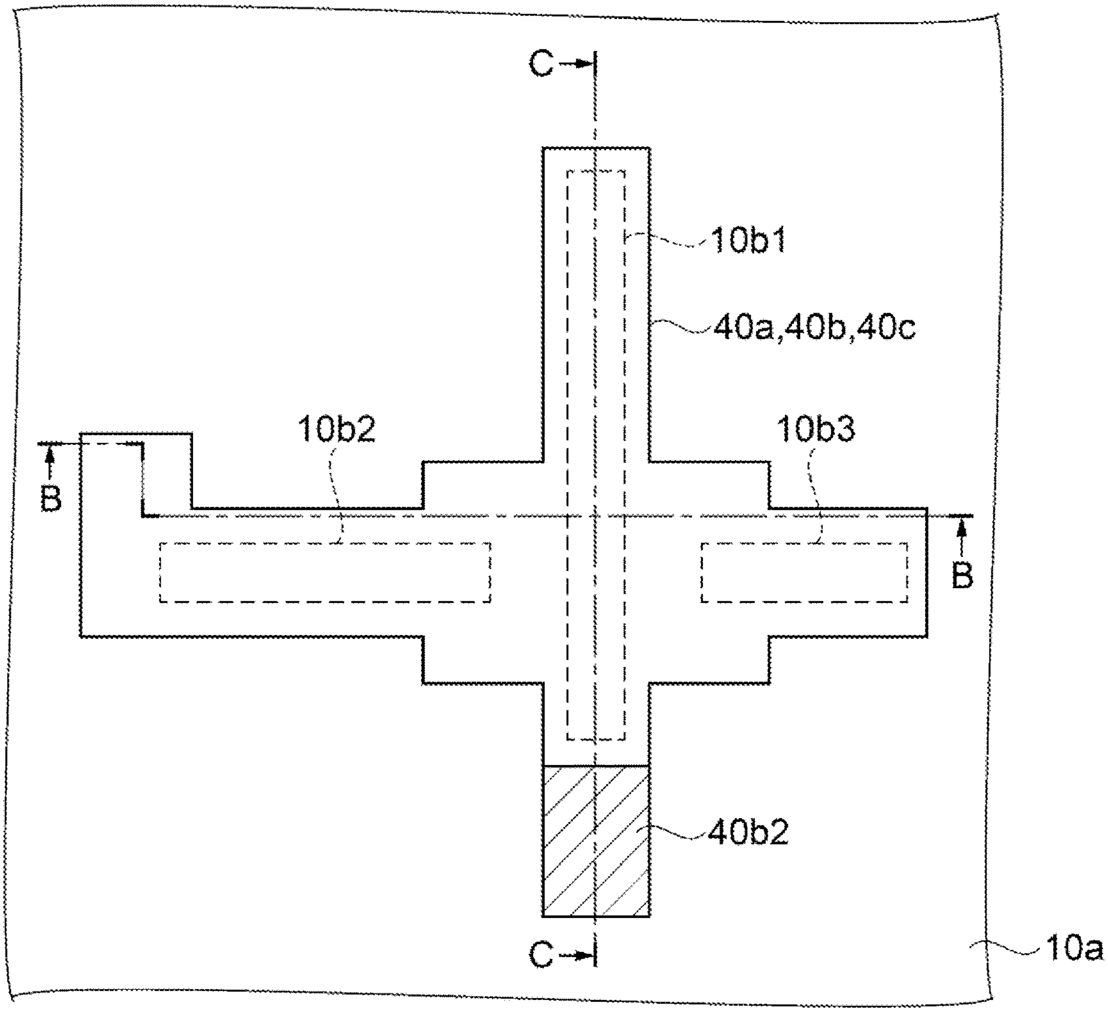
FIG. 7A is a plan view illustrating a method of manufacturing a liquid crystal device.
Figure 7B:
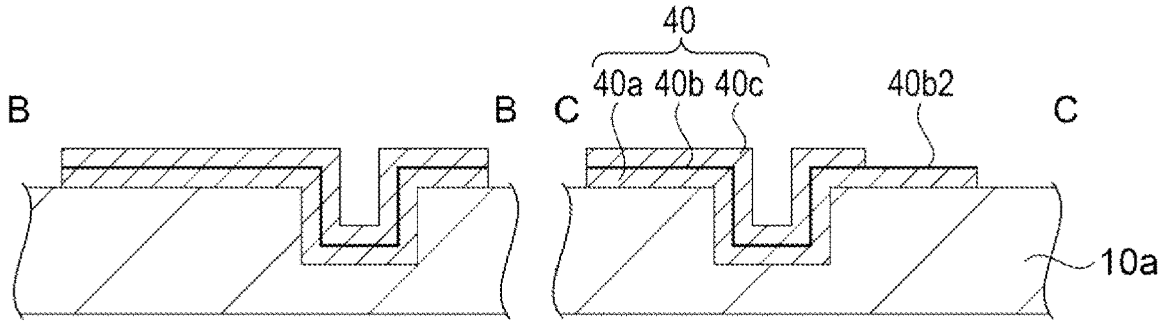
FIG. 7B is a cross-sectional view illustrating a method of manufacturing a liquid crystal device.

In the process illustrated in FIGS. 7A and 7B, the capacitance insulation film 40*b* is used as an etching stopper to remove a portion of the second capacitance electrode 40*c*. With this process, a portion 40*b*2 of the capacitance insulation film 40*b* is exposed.

Figure 8A:
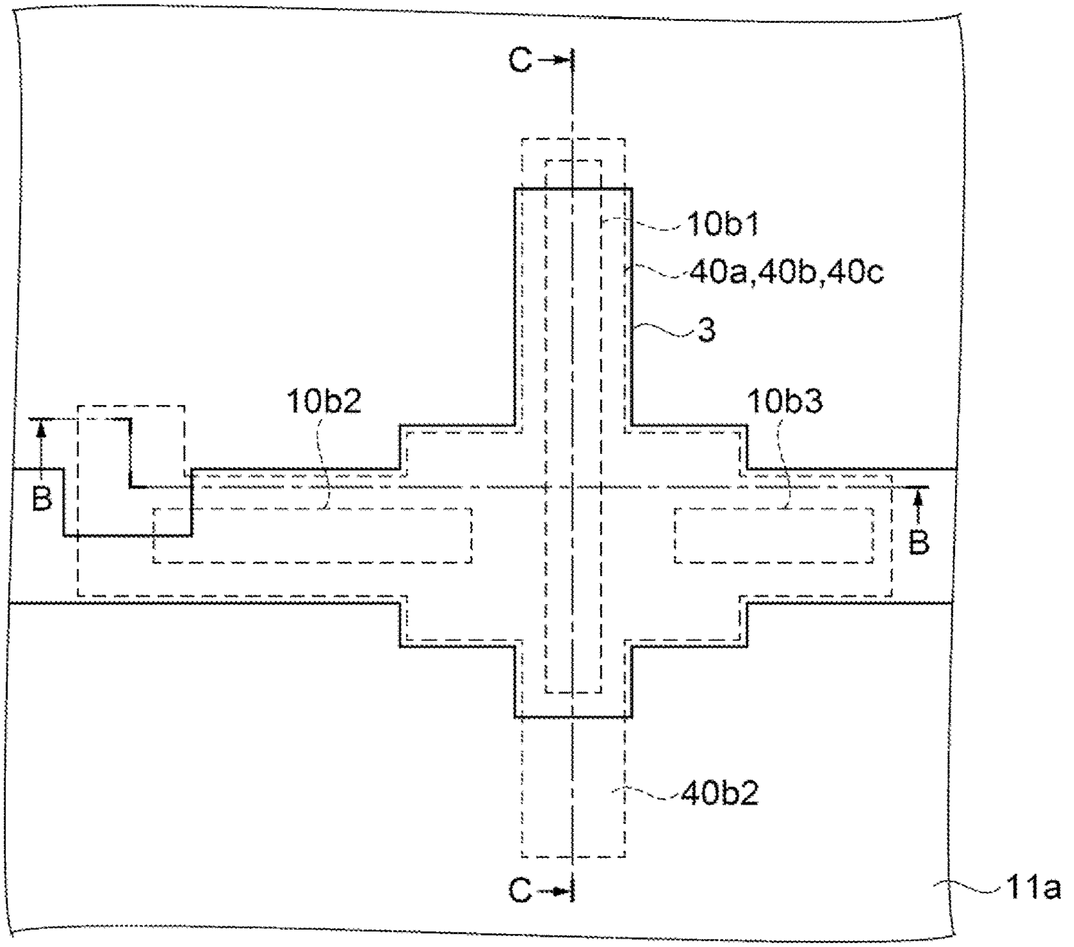
FIG. 8A is a plan view illustrating a method of manufacturing a liquid crystal device.
Figure 8B:
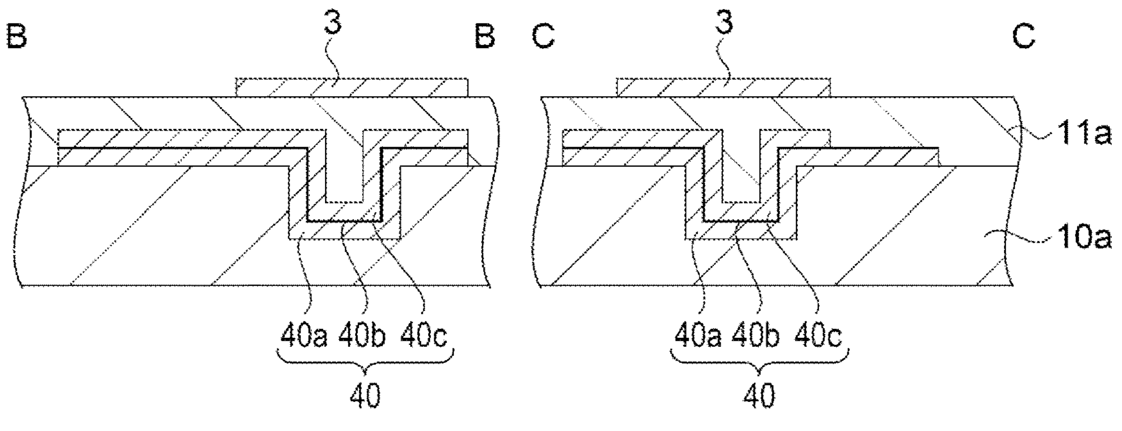
FIG. 8B is a cross-sectional view illustrating a method of manufacturing a liquid crystal device.

In the process illustrated in FIGS. 8A and 8B, the first interlayer insulating film 11*a* made of silicon oxide or the like is formed at the substrate 10*a*. Next, at the first interlayer insulating film 11*a*, the scanning line 3 made of tungsten silicide or the like is patterned and formed along the X direction so as to overlap with the capacitance element 40.

Figure 9A:
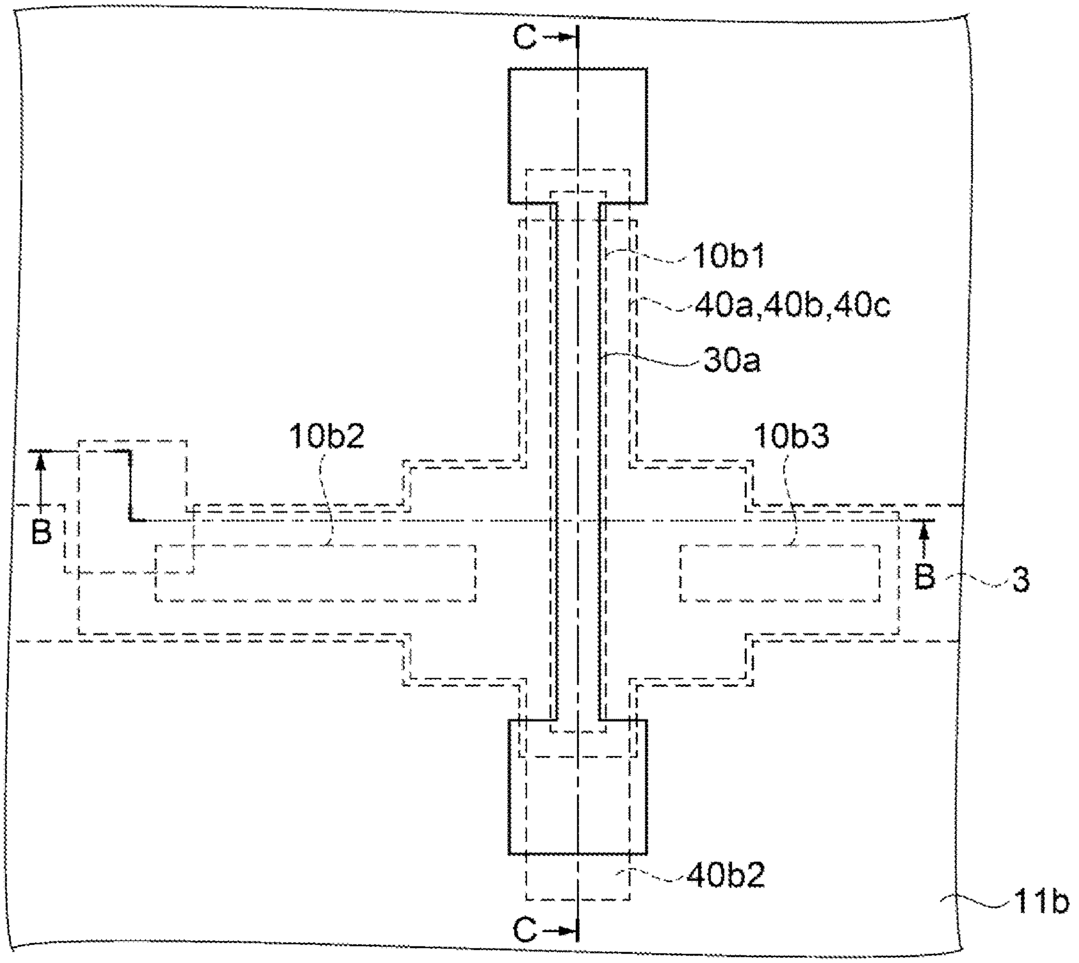
FIG. 9A is a plan view illustrating a method of manufacturing a liquid crystal device.
Figure 9B:
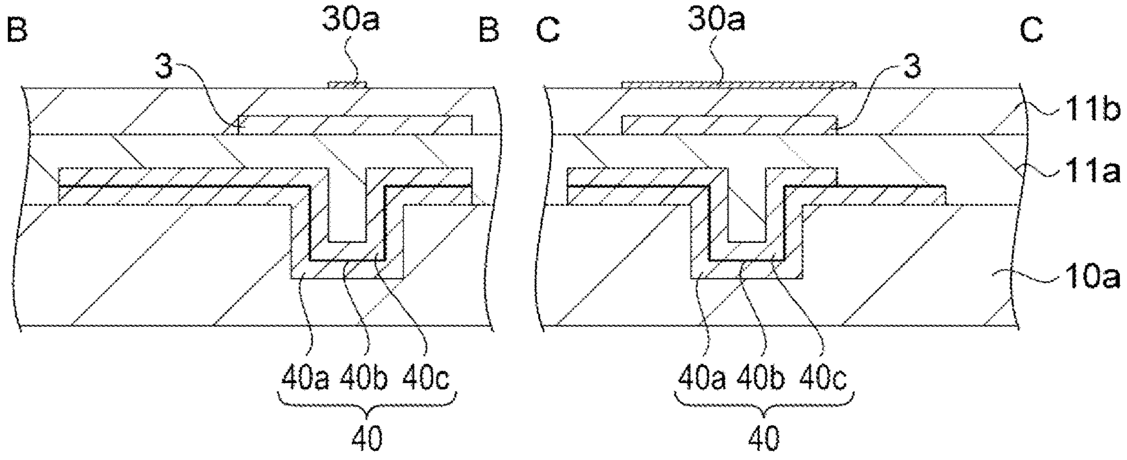
FIG. 9B is a cross-sectional view illustrating a method of manufacturing a liquid crystal device.

In the process illustrated in FIGS. 9A and 9B, the second interlayer insulating film 11*b* made of silicon oxide or the like is formed at the substrate 10*a*. Next, the semiconductor layer 30*a* made of electrically conductive polysilicon is patterned and formed at the second interlayer insulating film 11*b*.

Figure 10A:
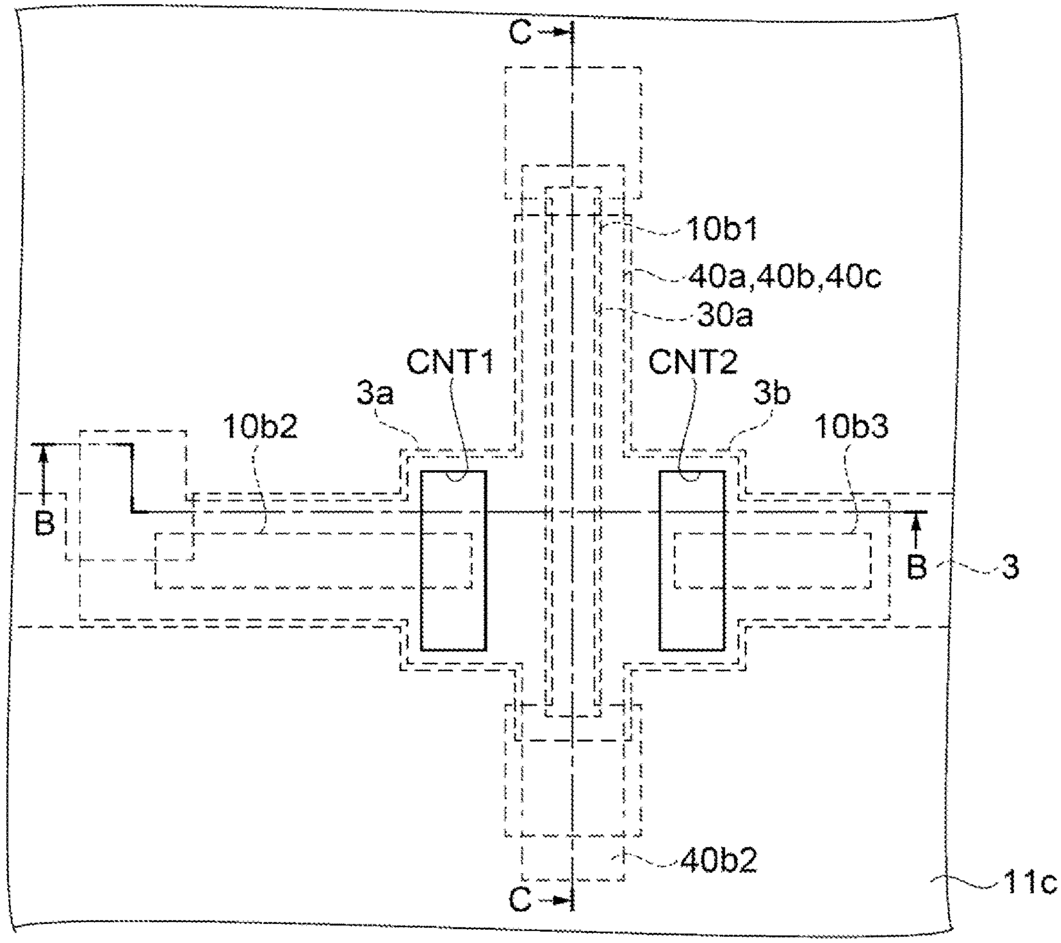
FIG. 10A is a plan view illustrating a method of manufacturing a liquid crystal device.
Figure 10B:
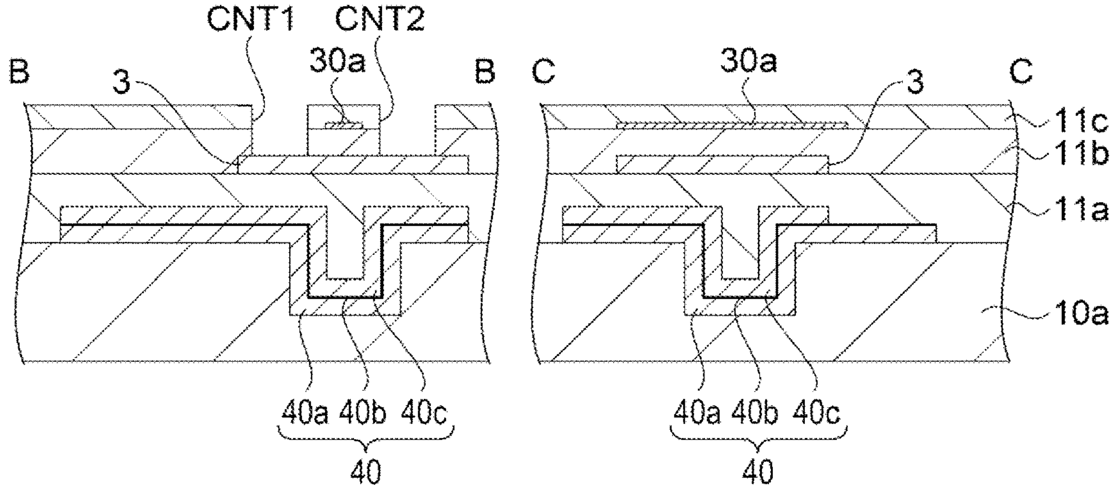
FIG. 10B is a cross-sectional view illustrating a method of manufacturing a liquid crystal device.

In the process illustrated in FIGS. 10A and 10B, contact holes CNT1 and CNT2 are formed at positions that overlap with extended portions 3*a* and 3*b* of the scanning line 3 in plan view. The extended portions 3*a* and 3*b* are disposed at both sides of the channel area of the semiconductor layer 30 a.

First, the third interlayer insulating film 11*c* also functioning as a gate insulating film and made of silicon oxide or the like is formed at the substrate 10*a*. Next, the contact holes CNT1 and CNT2 are formed at positions that overlap with the extended portions 3*a* and 3*b* of the scanning line 3 in plan view, so as to extend through the third interlayer insulating film 11*c* and the second interlayer insulating film 11*b*, and a portion of the scanning line 3 is exposed.

Figure 11A:
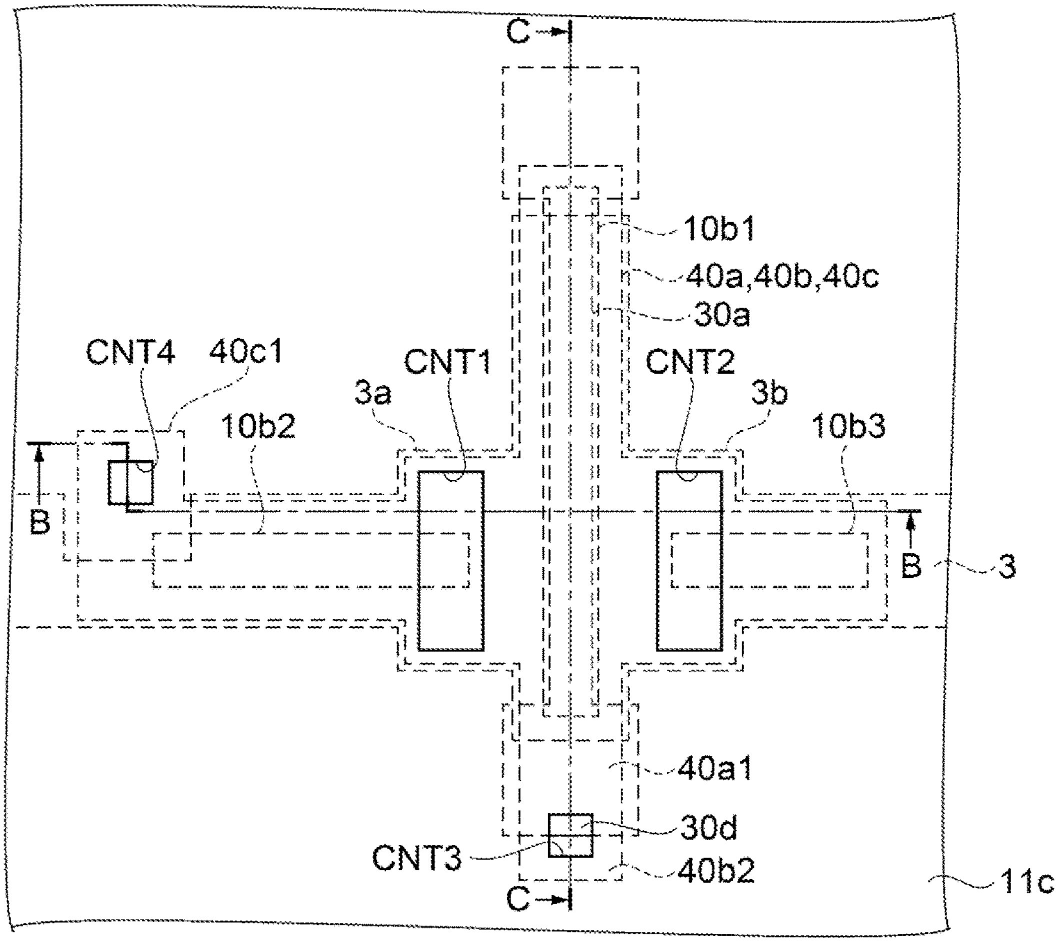
FIG. 11A is a plan view illustrating a method of manufacturing a liquid crystal device.
Figure 11B:
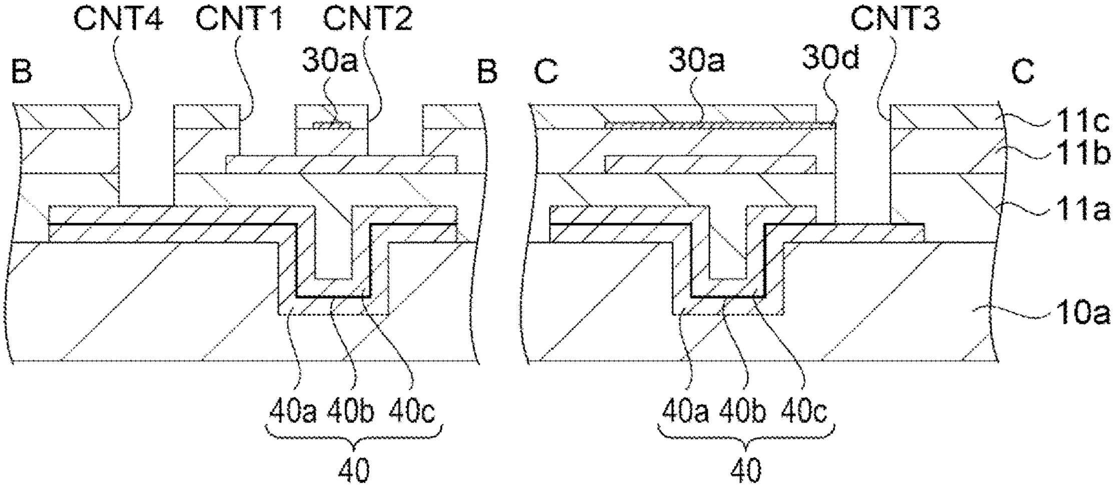
FIG. 11B is a cross-sectional view illustrating a method of manufacturing a liquid crystal device.

In the process illustrated in FIGS. 11A and 11B, a contact hole CNT3 serving as a first contact hole is formed at a position overlapping a portion 40*a*2 of the first capacitance electrode 40*a* in plan view, and a contact hole CNT4 serving as a second contact hole is formed at a position overlapping a portion 40*c*2 of the second capacitance electrode 40*c* using an etching process.

Specifically, the contact hole CNT3 is formed at a position that overlaps in plan view with the portion of the second capacitance electrode 40*c* removed in the process illustrated in FIGS. 7A and 7B, so as to extend through the third interlayer insulating film 11*c*, the second interlayer insulating film 11*b*, the first interlayer insulating film 11*a*, and the capacitance insulation film 40*b*, and a portion of the first capacitance electrode 40*a* is exposed. The etching process is performed so as to adjust conditions for the etching process such that a residual film of the capacitance insulation film 40*b* does not exists nor punch through of the first capacitance electrode 40*a* does not occur.

Note that, a portion of the third interlayer insulating film 11*c* covering the source drain region 30*d* of the semiconductor layer 30*a* is removed at the entrance side of the contact hole CNT3. This creates a state in which a portion of the source drain region 30*d* of the semiconductor layer 30*a* is exposed.

At the same time, the contact hole CNT4 is formed at a position that overlaps in plan view with the portion 40*c*2 of the second capacitance electrode 40*c*, so as to extend through the third interlayer insulating film 11*c*, the second interlayer insulating film 11*b*, and the first interlayer insulating film 11*a*, and a portion of the second capacitance electrode 40*c* is exposed.

Figure 12A:
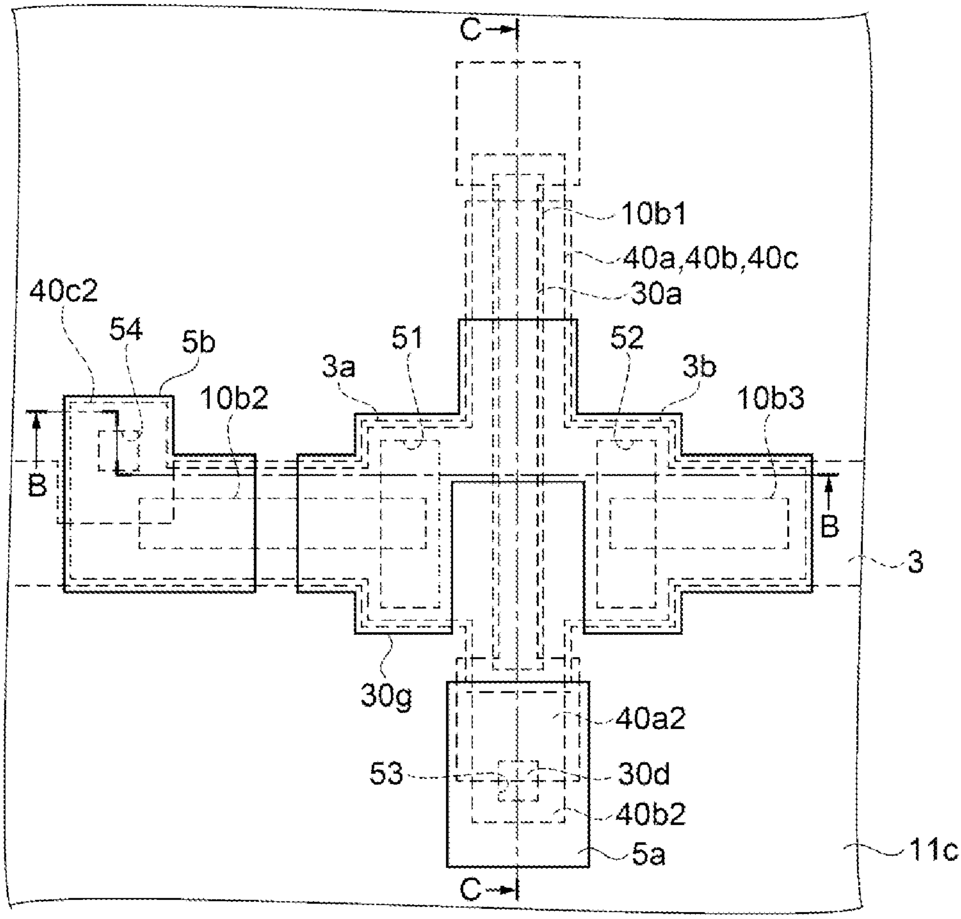
FIG. 12A is a plan view illustrating a method of manufacturing a liquid crystal device.
Figure 12B:
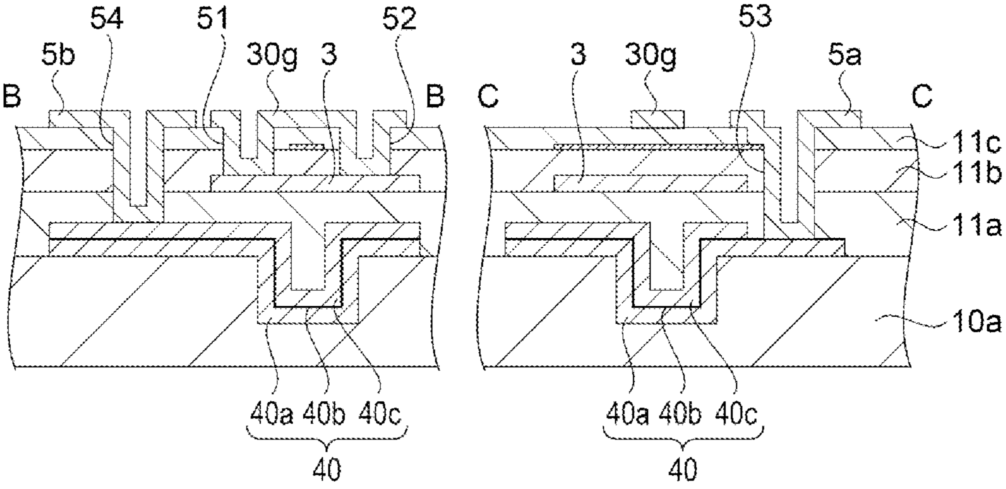
FIG. 12B is a cross-sectional view illustrating a method of manufacturing a liquid crystal device.

In the process illustrated in FIGS. 12A and 12B, an electrically conductive polysilicon film is formed at the third interlayer insulating film 11*c* at the inner walls and the bottoms of the contact holes CNT1, CNT2, CNT3, and CNT4. After this, the polysilicon film is patterned to form the gate electrode 30*g*, the contact electrodes 51, 52, 53, and 54, and relay electrodes 5*a* and 5*b*.

This makes the gate electrode 30*g* electrically coupled to the scanning line 3 through the contact electrodes 51 and 52. The relay electrode 5*a* is electrically coupled to the source drain region 30*d* and the first capacitance electrode 40*a* through the contact electrode 53. That is, the contact electrode 53 also functions as a source drain electrode. The relay electrode 5*b* is electrically coupled to the second capacitance electrode 40*c* through the contact electrode 54.

In addition, as described above, since the first capacitance electrode 40*a*, the capacitance insulation film 40*b*, and the second capacitance electrode 40*c* are patterned concurrently, it is possible to improve the positional accuracy of the formed capacitance element 40. Furthermore, since the capacitance element 40 is formed at the recessed portion 10*b*, it is possible to obtain capacitance while achieving miniaturization. In addition, since the etching stopper layer for removing a portion of the second capacitance electrode 40*c* is not formed, it is possible to prevent the etching stopper layer from being left in the capacitance element 40.

Figure 13A:
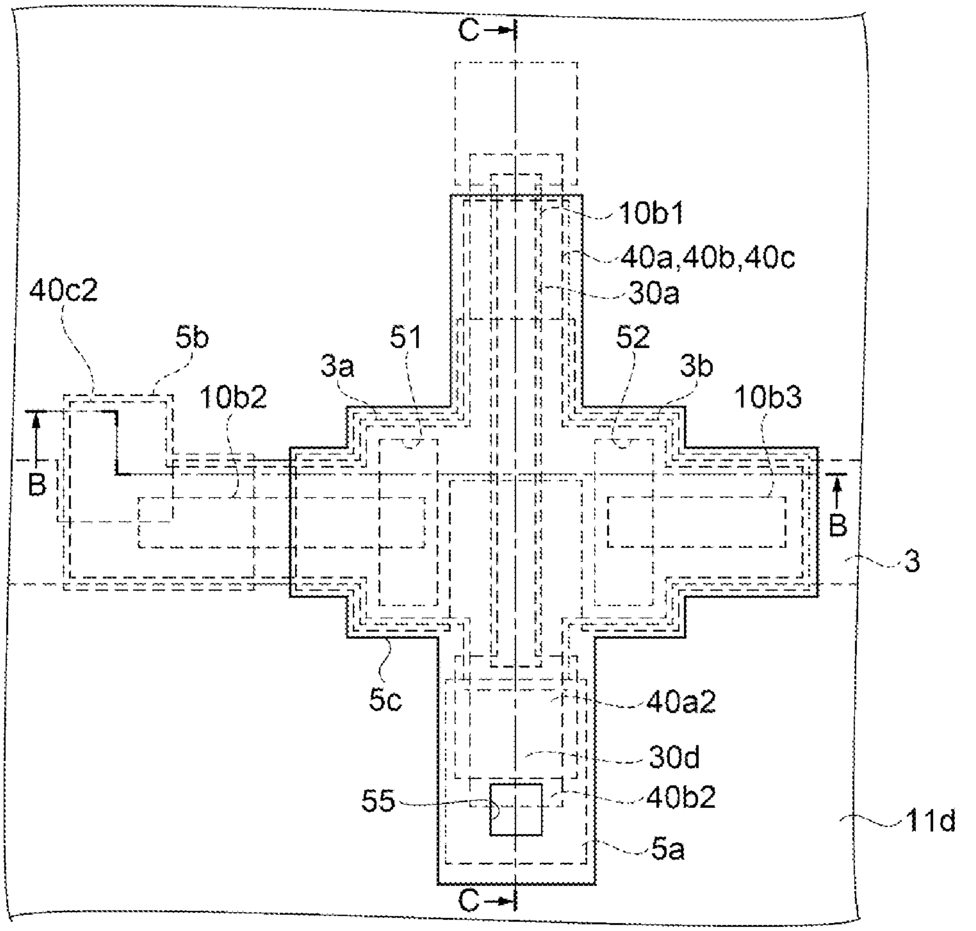
FIG. 13A is a plan view illustrating a method of manufacturing a liquid crystal device.
Figure 13B:
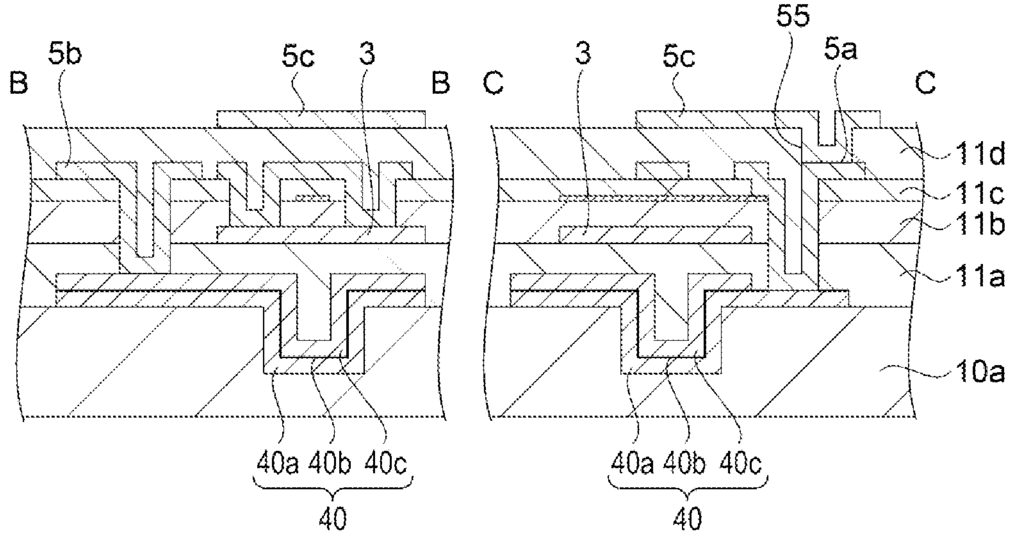
FIG. 13B is a cross-sectional view illustrating a method of manufacturing a liquid crystal device.

In the process illustrated in FIGS. 13A and 13B, the fourth interlayer insulating film 11*d* made of silicon oxide or the like is formed at the substrate 10*a*. Next, at the fourth interlayer insulating film 11*d*, a contact electrode 55 is formed at a position overlapping the relay electrode 5*a* in plan view, and the relay electrode 5*c* is patterned and is formed at the fourth interlayer insulating film 11*d*.

Figure 14A:
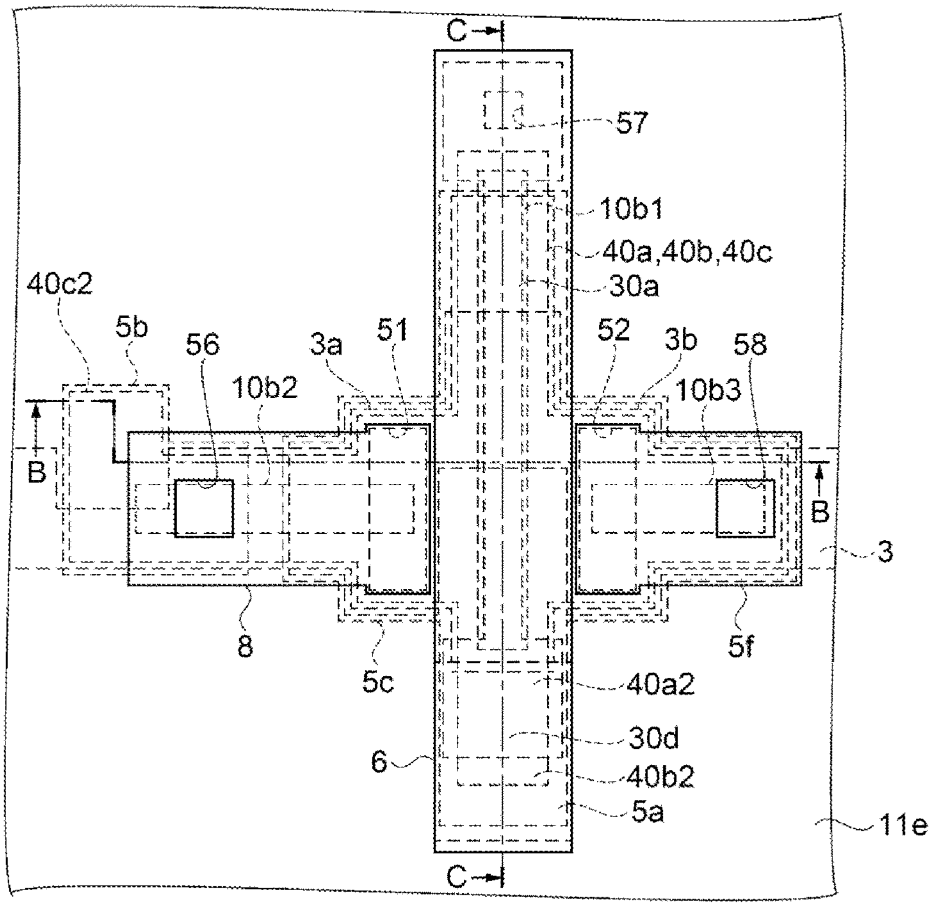
FIG. 14A is a plan view illustrating a method of manufacturing a liquid crystal device.
Figure 14B:
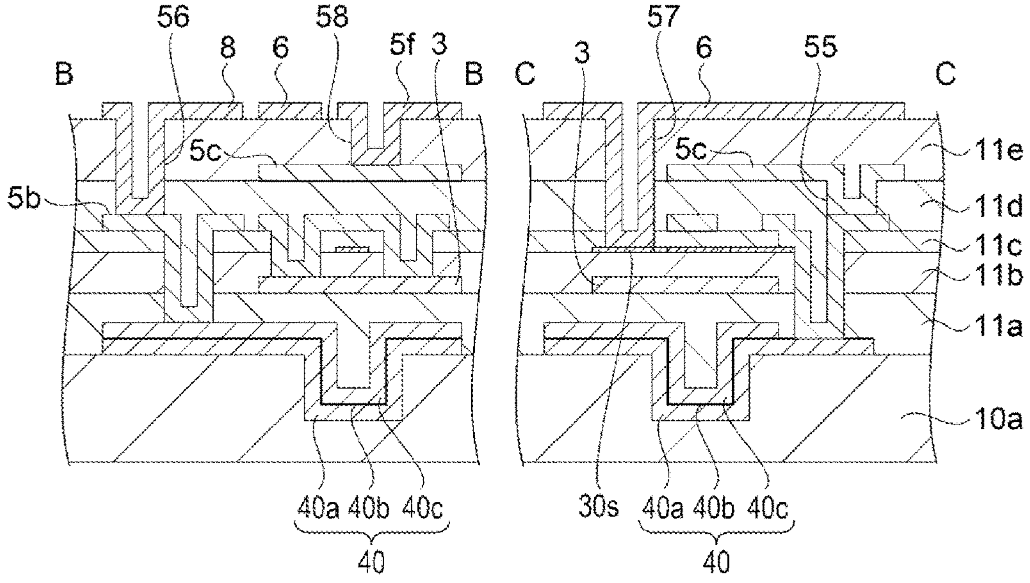
FIG. 14B is a cross-sectional view illustrating a method of manufacturing a liquid crystal device.

In the process illustrated in FIGS. 14A and 14B, the fifth interlayer insulating film 11*e* made of silicon oxide or the like is formed at the substrate 10*a*. Next, a contact electrode 57 is formed at a position overlapping the source drain region 30*s* in plan view, and the data line 6 is patterned and is formed at the fifth interlayer insulating film 11*e*. At the same time, a contact electrode 56 is formed at a position overlapping the relay electrode 5*b*, and the capacitance line 8 is patterned and is formed. At the same time, a contact electrode 58 is formed, and the relay electrode 5*f* is patterned and is formed.

Figure 15:
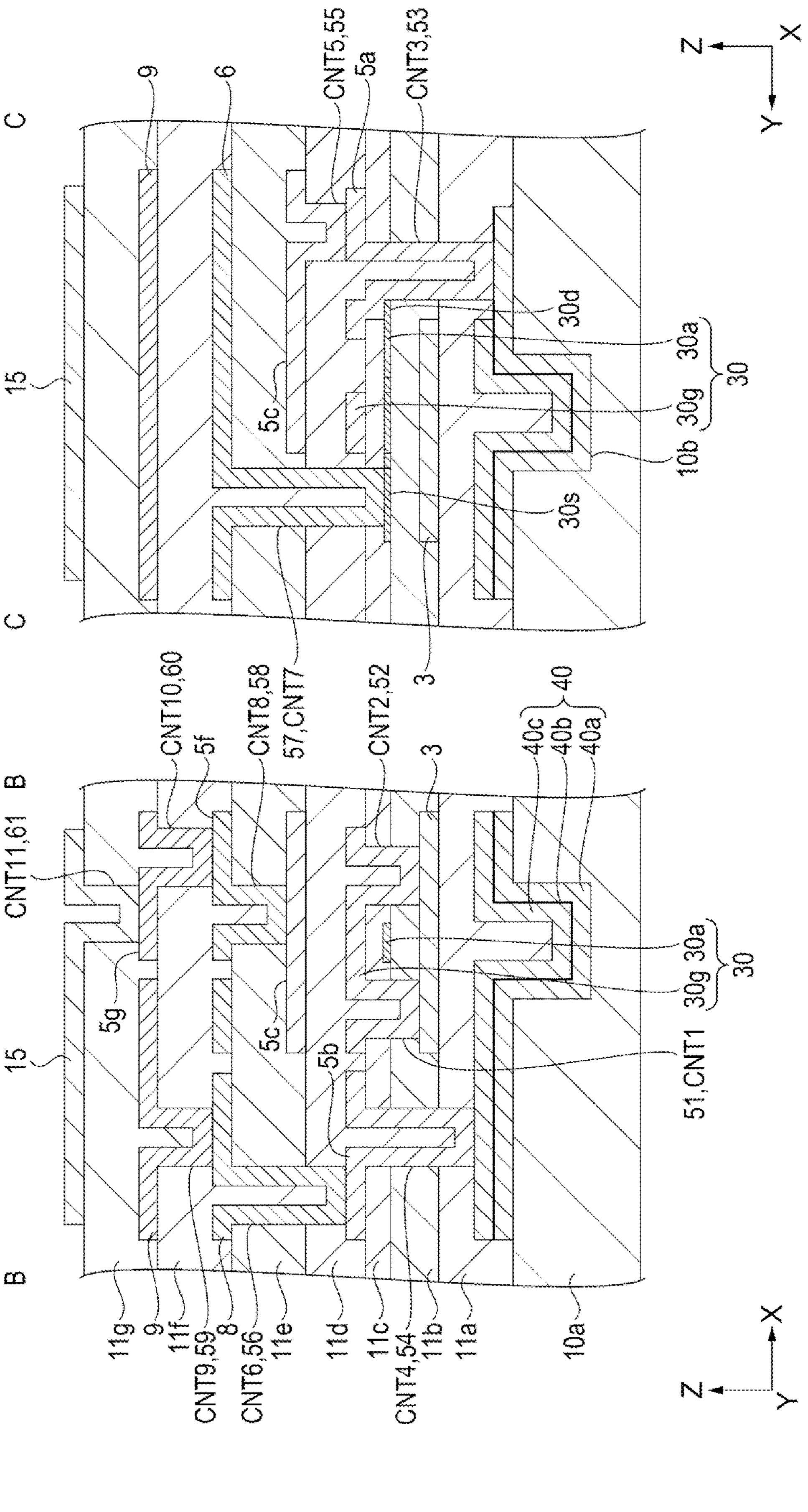
FIG. 15 is a cross-sectional view illustrating a method of manufacturing a liquid crystal device.

The process illustrated in FIG. 15 includes the rest of the manufacturing process, that is, includes forming the sixth interlayer insulating film 11*f*, contact electrodes 59, 60, the common wiring line 9, the seventh interlayer insulating film 11*g*, a contact electrode 61, and the pixel electrode 15.

As described above, the method of manufacturing the liquid crystal device 100 according to the present embodiment includes steps of: forming the recessed portion 10*b* in the substrate 10*a*; forming the first capacitance electrode 40*a*, the capacitance insulation film 40*b*, and the second capacitance electrode 40*c* along the recessed portion 10*b*; concurrently patterning the first capacitance electrode 40*a*, the capacitance insulation film 40*b*, and the second capacitance electrode 40*c*; removing a portion of the second capacitance electrode 40*c*; forming the interlayer insulating films 11*a*, 11*b*, 11*c*; and etching a region where a portion of the second capacitance electrode 40*c* is removed, until a portion of the first capacitance electrode 40*a* is exposed in plan view, to form the contact hole CNT3 extending through the interlayer insulating films 11*a*, 11*b*, 11*c* and the capacitance insulation film 40*b*.

With this method, the first capacitance electrode 40*a*, the capacitance insulation film 40*b*, and the second capacitance electrode 40*c* are concurrently patterned. This makes it possible to improve the positional accuracy of the formed capacitance element 40. In addition, as the capacitance element 40 is formed along the recessed portion 10*b*, it is possible to obtain capacitance while achieving miniaturization. In addition, since the etching stopper layer for removing a portion of the second capacitance electrode 40*c* is not formed, it is possible to prevent the etching stopper layer from being left in the capacitance element 40.

In addition, in the method of manufacturing the liquid crystal device 100 according to the present embodiment, it is preferable that the capacitance insulation film 40*b* contains silicon nitride. With this method, as the capacitance insulation film 40*b* contains silicon nitride, it is possible to improve the performance of the capacitance element 40.

In addition, in the method of manufacturing the liquid crystal device 100 according to the present embodiment, it is preferable that the step of forming the contact hole CNT3 includes concurrently forming the contact hole CNT4 for electrically coupling the second capacitance electrode 40*c* and the capacitance line 8. With this method, the contact holes CNT3 and CNT4 coupled to the two capacitance electrodes 40*a* and 40*c*, respectively, are concurrently formed. This makes it possible to reduce the number of steps.

In addition, in the method of manufacturing the liquid crystal device 100 according to the present embodiment, it is preferable that the recessed portion 10*b* extends along the Y direction at a position overlapping the semiconductor layer 30*a* of the transistor 30 that extends along the first direction. With this method, the recessed portion 10*b* is formed so as to overlap with the semiconductor layer 30*a*. This makes it possible to maintain the opening ratio without reducing the opening area between a pixel P and a pixel P.

In addition, in the method of manufacturing the liquid crystal device 100 according to the present embodiment, it is preferable that, after forming the first interlayer insulating film 11*a*, the method includes forming the scanning line 3 and forming the transistor 30 at a position overlapping the scanning line 3 in plan view, and before the gate electrode 30*g* of the transistor 30 is formed, the contact hole CNT3 is formed. With this method, the contact hole CNT3 is formed before the gate electrode 30*g* is formed. This makes it possible to form the contact electrode 53 at the same time as the gate electrode 30*g*.

In addition, in the method of manufacturing the liquid crystal device 100 according to the present embodiment, it is preferable that the contact electrode 53 also functioning as a source drain electrode is formed concurrently with the gate electrode 30*g* so as to be in contact with the first capacitance electrode 40*a* through the contact hole CNT3. With this method, it is possible to also form the source drain electrode concurrently with the gate electrode 30*g*, which makes it possible to reduce the number of steps.

What is claimed is:

1. A method of manufacturing an electro-optical device, comprising:
- forming a recessed portion at an insulating member;
- forming a first capacitance electrode, a capacitance insulation film, and a second capacitance electrode along the recessed portion;
- concurrently patterning the first capacitance electrode, the capacitance insulation film, and the second capacitance electrode;
- removing a portion of the second capacitance electrode by using the capacitance insulation film as an etching stopper,
- forming an interlayer insulating film; and
- etching, at a region where the portion of the second capacitance electrode is removed, the interlayer insulating film and the capacitance insulation film concurrently until a portion of the first capacitance electrode is exposed in plan view, to form a first contact hole penetrating through the interlayer insulating film and the capacitance insulation film.

2. The method of manufacturing an electro-optical device according to claim 1, wherein
- the capacitance insulation film contains silicon nitride.

3. The method of manufacturing an electro-optical device according to claim 1, wherein
- in the formation of the first contact hole, a second contact hole configured to electrically couple the second capacitance electrode and a capacitance line is concurrently formed.

4. The method of manufacturing an electro-optical device according to claim 1, wherein
- the recessed portion extends along a first direction at a position overlapping a semiconductor layer of a transistor extending along the first direction.

5. The method of manufacturing an electro-optical device according to claim 4, the method comprising, after the formation of the interlayer insulating film, forming a light shielding film, and forming the transistor at a position overlapping the light shielding film in plan view, wherein before forming a gate electrode of the transistor, the first contact hole is formed.

6. The method of manufacturing an electro-optical device according to claim 5, wherein concurrently with the formation of the gate electrode, a source drain electrode is formed, so as to be in contact with the first capacitance electrode through the first contact hole.

7. A method of manufacturing an electro-optical device, comprising:

forming a recessed portion at an insulating member;

forming a first capacitance electrode, a capacitance insulation film, and a second capacitance electrode along the recessed portion;

concurrently patterning the first capacitance electrode, the capacitance insulation film, and the second capacitance electrode;

removing a portion of the second capacitance electrode by using the capacitance insulation film as an etching stopper;

forming a first interlayer insulating film so as to cover the second capacitance electrode and a portion of the capacitance insulation film exposed from the second capacitance electrode;

after forming the first interlayer insulating film, forming a light shielding film at a position overlapping the recessed portion in plan view, forming a second interlayer insulating film so as to cover the light shielding film;

forming a transistor at a position overlapping the light shielding film in plan view, and before forming a gate electrode of the transistor, etching, until a portion of the first capacitance electrode is exposed in plan view, a region where the portion of the second capacitance electrode is removed, to form a first contact hole penetrating through the second interlayer insulating film, the first interlayer insulating film, and the capacitance insulation film.

8. The method of manufacturing an electro-optical device according to claim 7, wherein in the formation of the first contact hole, etching, until a portion of a semiconductor layer of the transistor is exposed in plan view, and concurrently with the formation of the gate electrode, a source drain electrode is formed, so as to be in contact with the portion of the semiconductor layer through the first contact hole.

9. The method of manufacturing an electro-optical device according to claim 7, wherein in the formation of the first capacitance electrode, the capacitance insulation film, and the second capacitance electrode, the first capacitance electrode, the capacitance insulation film, and the second capacitance electrode are formed so as to completely cover a side surface of the recessed portion and a bottom surface of the recessed portion.

* * * * *